(No Model.) 2 Sheets—Sheet 1.

L. BRILLIÉ.
ELECTRIC METER.

No. 511,401. Patented Dec. 26, 1893.

WITNESSES:
Fred White
C. K. Fraser.

INVENTOR:
Lucien Brillié,
By his Attorneys
Arthur E. Fraser & Co.

(No Model.) 2 Sheets—Sheet 2.

L. BRILLIÉ.
ELECTRIC METER.

No. 511,401. Patented Dec. 26, 1893.

WITNESSES:
Fred White
C. K. Fraser.

INVENTOR:
Lucien Brillié,
By his Attorneys

UNITED STATES PATENT OFFICE.

LUCIEN BRILLIÉ, OF PARIS, FRANCE.

ELECTRIC METER.

SPECIFICATION forming part of Letters Patent No. 511,401, dated December 26, 1893.

Application filed November 22, 1893. Serial No. 491,611. (No model.) Patented in France July 13, 1891, No. 214,851, and in England October 23, 1893, No. 19,934.

*To all whom it may concern:*

Be it known that I, LUCIEN BRILLIÉ, a citizen of the Republic of France, residing in Paris, France, have invented certain new and useful Improvements in Electric Meters, of which the following is a specification.

This invention was patented in France by a certificate of addition dated May 3, 1893, to the original patent of July 13, 1891, No. 214,851; and in England by patent dated October 23, 1893, No. 19,934.

The present invention constitutes an improvement upon the construction of electric meter disclosed in my United States Patent No. 479,932, dated August 2, 1892. The improvements are designed to simplify the apparatus and render its operation more perfect.

Figure 1:
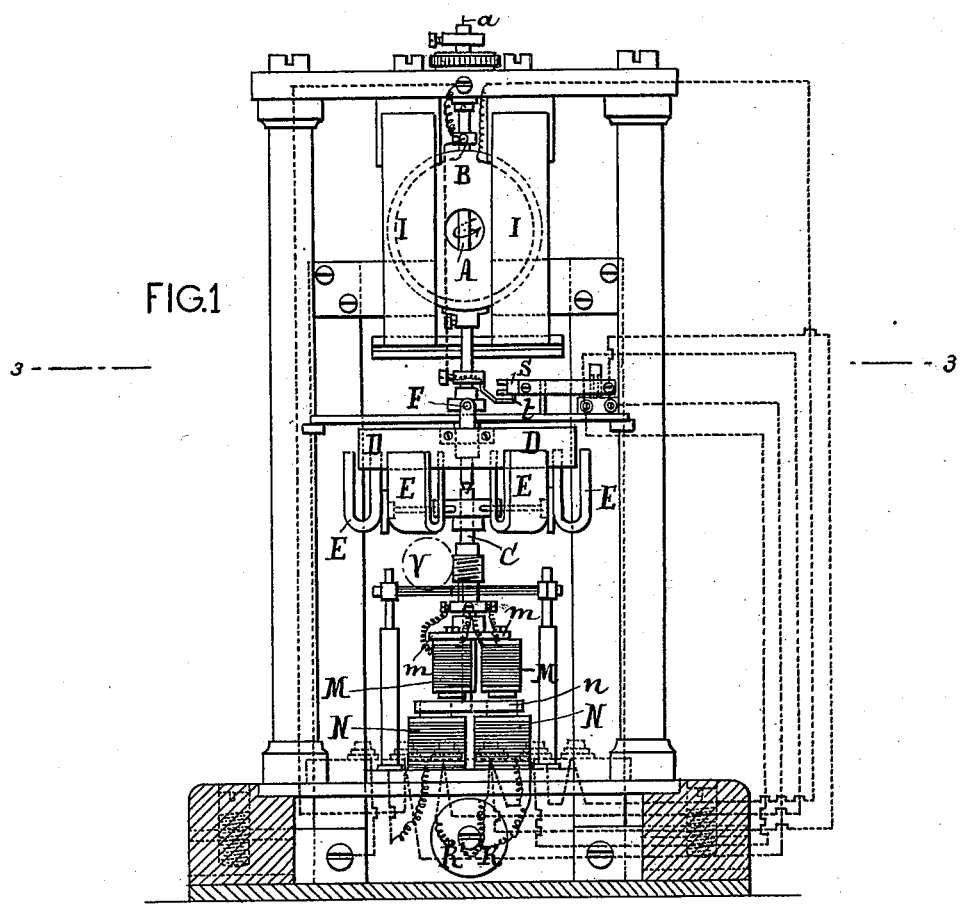
Figure 3:
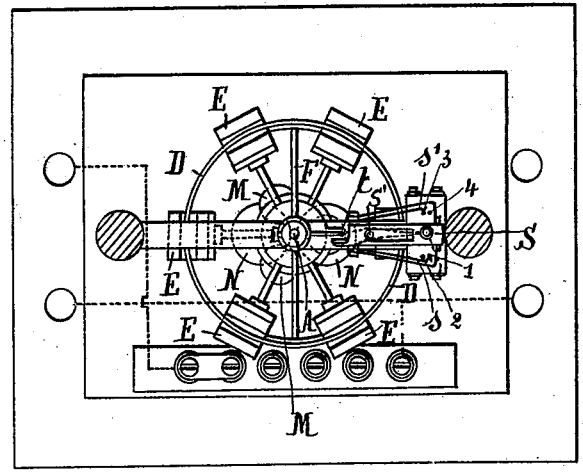
Figure 2:
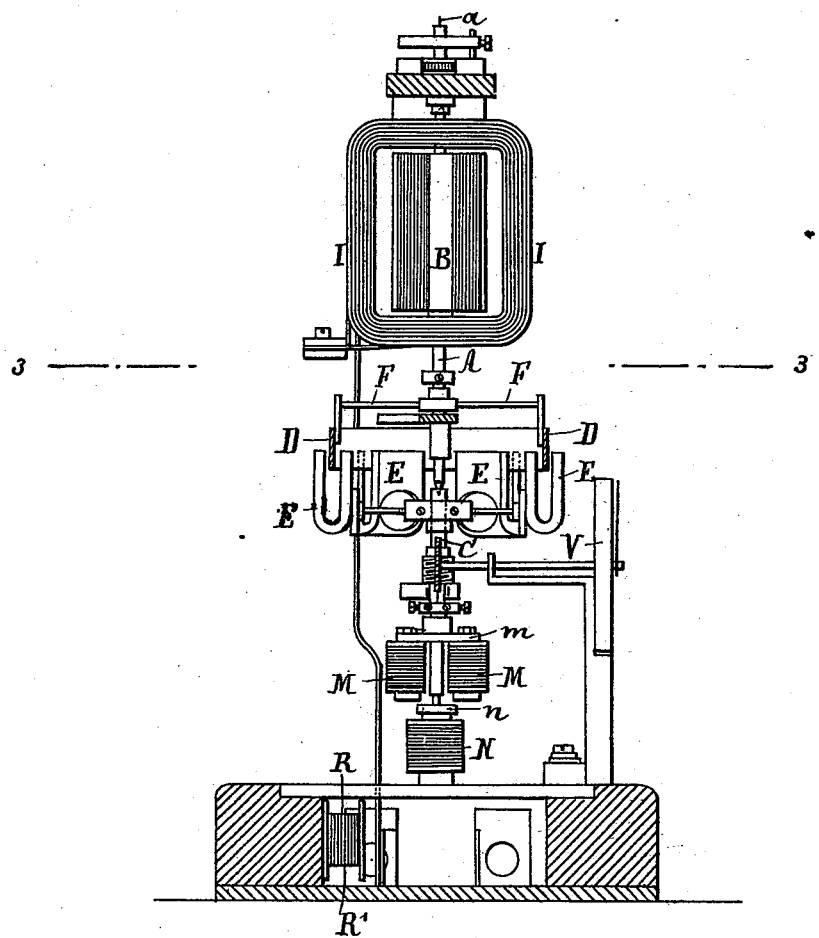

Figure 1 of the accompanying drawings is a front elevation partly in vertical section. Fig. 2 is a vertical transverse mid-section, and Fig. 3 is a horizontal section in the plane of the line 3—3 in Figs. 1 and 2.

My improved electric meter comprises generally four distinct parts, namely:—First. A spindle or axis A free to oscillate through several degrees and carrying the movable coil B of an electro dynamometer turning within stationary coils I I; and carrying also a conducting cylinder D supported by arms F. Second. A spindle or axis C placed in line with A and rotated by a motor M N. This spindle carries a group of any number of permanent magnets E E of U-shape, arranged regularly around the spindle so that their polar ends shall stand on opposite sides of the metal cylinder D. Third. A regulating rheostat consisting of a commutator and resistances R R′ introduced in the circuit of the motor M and worked by the movements of the spindle A to control the speed of the motor. Fourth. A revolution counter or totalizer V driven from the spindle C of the motor and serving to register the expenditure of electric energy.

The electro dynamometer consists of fixed coils of coarse wire I I forming part of the main circuit, and of a movable coil B of fine wire in shunt between the two current conductors. The coil B tends to be deflected in the direction of the arrow in Fig. 1, and this deflection is resisted by the tension or torsional stress of a fine wire $a$ extended through the spindle A which is tubular, the lower end of the wire being fixed to the spindle, and its upper end attached to a fixed piece at the top as formerly. The spindle A thus suspended, is centered by pivotal bearings at its ends.

The motor consists of three movable coils M M on iron cores which are attached to an iron head $m$ and connected to a commutator having three segments. The inductor or field-magnet N consists of similar coils the cores of which are attached to an iron head $n$. The direction of motion of the motor is opposite to the arrow in Fig. 1. As it revolves the U-shaped magnets E E in turning round in proximity to the metal cylinder D, generate currents in the latter which tend to draw it around with them, this tendency constituting a couple proportional to the speed of the magnets. This couple is opposed to the couple which tends to deflect the coil of the electro-dynamometer, and which is proportional to the current. If the speed is so regulated that the spindle A remains always in equilibrium under the action of these two opposing forces, the speed of the magnets will at every instant be proportional to the strength of the current to be measured, and it will only be necessary to count the revolutions by the revolution counter V to ascertain the energy expended. The position of equilibrium is maintained by means of the regulating rheostat consisting of the resistance coils R R′ and the commutator, the object of which is to vary the current applied to the motor through a special shunt according as the position of the spindle A changes. The movements of this spindle therefore act upon the motor in the same manner as the governor of an engine in order to regulate its speed. This rheostat regulates the current to the motor under the same conditions as those explained fully in my previous patent. It consists of an insulating piece S pivoted at S′ and oscillated by a contact pin $t$ carried by an arm fixed on the spindle A (see Fig. 1). This pin $t$ working loosely in the forked arm of the piece S, acts to oscillate it sufficiently to carry its two flexible blades or springs $s\ s'$ into contact with one or other of two pairs of contact pins 1, 2, 3, 4, mounted on a fixed block, the spring $s'$ touching alternately the pins 3 and 4, while the spring s touches alternately the pins 1 and 2. The connection of these pins with the respective terminals and resistances R R' is fully described in my previous patent, and being unchanged it is not necessary to describe it here, further than to state than when the speed of the motor becomes excessive and serves through the action of the magnets E E upon the cylinder D to deflect the spindle A beyond the position of equilibrium, the commutator acts first to reduce the current by passing it through the resistance R R', and subsequently to break the circuit to the motor until the speed thereof is reduced to the required extent, whereupon an opposite oscillatory movement of the spindle A occurs, thereby restoring the current to the motor, the axis A thus maintaining automatically a slight oscillatory movement during the normal working of the apparatus such as to automatically maintain the motor at the required speed.

My improved construction of electric meter is simplified compared with that shown in my former patent, since the spindle C is utilized not merely to carry the magnets E E, but also to carry the motor armature M, thus dispensing with the interposed gearing. The magnetic retarder D E is improved by the substitution of a cylinder for the washer-shaped disk formerly employed, and of U-shaped magnets E for the opposite bar magnets disposed on opposite sides of the plane of the disk as formerly employed. Consequently such nicety of adjustment as was formerly desirable is not necessary, since the magnets E exert no tendency to attract the cylinder D in vertical direction, and hence have no effect tending to displace either of the spindles A or C. The mechanical construction is also simplified by this arrangement, since it is no longer necessary to provide a bearing for the spindle C above the plane of the metal part or armature D of the retarder in order to support the latter by arms extended considerably below the lower end of the upper spindle A as formerly.

I claim as my invention the following-defined novel features, substantially as hereinbefore set forth, namely:

1. In an electric meter wherein an electro dynamometer serves to control the speed of an electro motor exerting an opposing tendency on the dynamometer through the medium of a magnetic retarder, the construction of such retarder with a metal cylinder D connected to one part, and a plurality of U-shaped magnets E with their poles projecting on opposite sides of said cylinder and connected to the other part.

2. In an electric meter wherein an electro dynamometer serves to control the speed of an electro motor exerting an opposing tendency on the dynamometer through the medium of a magnetic retarder, the combination with the dynamometer spindle A of a spindle C in line therewith, the respective parts of the retarder being carried by the adjacent ends of the two spindles, and the movable part M of the electro-motor carried directly by said spindle C.

In witness whereof I have hereunto signed my name in the presence of two subscribing witnesses.

LUCIEN BRILLIÉ.

Witnesses:
CLYDE SHROPSHIRE,
AUGUSTE MATHIEU.